United States Patent [19]

Takahashi et al.

[11] 4,107,151
[45] Aug. 15, 1978

[54] PROCESS FOR PRODUCING URETHANE ELASTOMER

[75] Inventors: Akio Takahashi, Yokohama; Hirokichi Saito, Shimizu; Yoshijiro Oyaizu, Yaizu, all of Japan

[73] Assignee: Ihara Chemical Company Co., Ltd., Tokyo, Japan

[21] Appl. No.: 736,346

[22] Filed: Oct. 28, 1976

[51] Int. Cl.² .................... C08G 18/65; C08G 18/14; C08G 18/16

[52] U.S. Cl. ........................ 528/54; 260/2.3; 260/2.5 BC; 260/77.5 AM; 260/77.5 AQ; 260/75 NC; 260/75 NB; 260/2.5 AB; 260/2.5 AC; 528/68; 528/58; 528/53; 528/76; 528/79; 528/65

[58] Field of Search .............. 260/75 NQ, 77.5 AQ, 260/2.3, 2.5 BC, 77.5 AM

[56] References Cited

U.S. PATENT DOCUMENTS

| | | | |
|---|---|---|---|
| 2,917,471 | 12/1959 | Nelson | 260/2.3 |
| 2,937,151 | 5/1960 | Ten Broeck et al. | 260/2.3 |
| 3,031,271 | 4/1962 | Weinbrenner et al. | 260/2.5 BC |
| 3,232,709 | 2/1966 | Cole | 260/2.5 BC |
| 3,248,373 | 4/1966 | Barringer | 260/75 NQ |
| 3,368,985 | 2/1968 | Wismer et al. | 260/77.5 AQ |
| 3,397,184 | 8/1968 | Heydkamp et al. | 260/75 NQ |
| 3,483,167 | 12/1969 | Sommer et al. | 260/77.5 AM |
| 3,655,588 | 4/1972 | Mosso et al. | 260/77.5 AQ |
| 3,708,440 | 1/1973 | Frulla et al. | 260/2.3 |
| 3,983,087 | 9/1976 | Tucker et al. | 260/2.3 |

OTHER PUBLICATIONS

Dombrow - Polyurethanes, 2nd Ed. Reinhold, N. Y. (1965) pp. 144-146.

*Primary Examiner*—H.S. Cockeram
*Attorney, Agent, or Firm*—Oblon, Fisher, Spivak, McClelland & Maier

[57] ABSTRACT

A urethane elastomer is produced by simultaneously reacting an organic polyisocyanate with
(1) a chain polyol having a molecular weight of 400 to 5,000,
(2) an aromatic diamine and
(3) a polyol having at least one urethane bond and/or an amino alcohol having at least one urethane bond.

13 Claims, 1 Drawing Figure

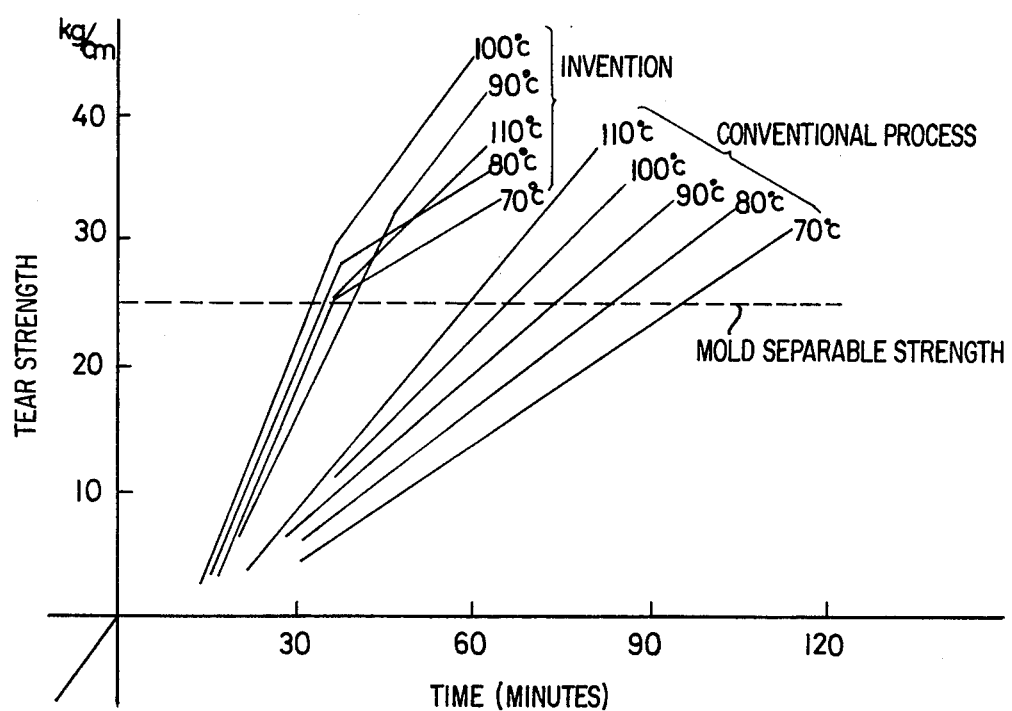

PROCESS FOR PRODUCING URETHANE ELASTOMER

BACKGROUND OF THE INVENTION

The present invention relates to a process for producing a urethane elastomer by a one shot method. More particularly, it relates to a process for molding a urethane elastomer having excellent properties in a short cycle by a one shot method.

It has been proposed to produce urethane elastomers having suitable properties by reacting an organic polyisocyanate with (1) a chain polyol having a molecular weight of 400 to 5,000 and (2) an aromatic diamine.

In the process for producing a urethane elastomer by a one shot method, the components used as the starting materials are chemically stable and have lower viscosity in comparison with those of the urethane prepolymer, whereby the operation can be effectively performed especially in the casting operation using a casting apparatus.

In accordance with the conventional one shot method, the pot-life is advantageously shorter than that of the prepolymer method. However, there are disadvantages that a tendency of a phase separation is found after gelation and the reaction velocity decreases and an initial strength is slowly imparted to take a long time from the injection to the mold-separation (mold-separable period). Accordingly, the casting processibility is good, nevertheless, the casting cycle could not be shortened disadvantageously.

When a large amount of a catalyst is used in order to shorten the mold-separable period, the pot-life is remarkably shortened to make trouble in the casting and the physical properties of the shaped product especially an ageing deterioration resistance is decreased.

SUMMARY OF THE INVENTION

It is an object of the present invention to provide a process for producing a urethane elastomer in a short mold-separable period and high productivity without decreasing the chemical stability and the casting-processibility due to low viscosity, which are typical advantages in the one shot method.

Another object of the invention is to provide a process for producing a urethane elastomer to rapidly impart high initial strength after the gelation without causing an adverse effect for pot-life while preventing a tendency of phase-separation.

These objects of the invention have been attained by producing a urethane elastomer by simultaneously reacting as components an organic polyisocyanate with (1) a chain polyol having a molecular weight of 400 to 5,000, (2) an aromatic diamine and (3) a polyol having at least one urethane bond and/or an amino alcohol having at lest one urethane bond at a ratio of 5 to 40 mole % of the polyol and/or the amino alcohol (3) to total of the polyol (1) and the polyol and the amino alcohol (3). The conditions for simultaneously reacting the organic polyisocyanate with the other three types of components are obtained by so forming a mixture of all four components that the polyisocyanate may react with the other three components during the same period of time.

DETAILED DESCRIPTION OF THE PREFERRED EMBODIMENTS

The components (3) are obtained as follows:

The polyols having at least one urethane bond which are used in the process of the invention can be easily produced by reacting a compound having an isocyanate group with excess of a polyol and/or an amino alcohol.

A glycol having one urethane bond (1) can be obtained by reacting 1 mole of a monovalent isocyanate with 1 mole of a triol

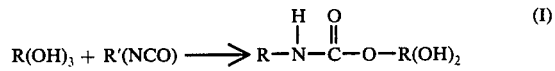

A glycol having two urethane bonds (2) can be obtained by reacting 2 moles of glycol with 1 mole of a diisocyanate

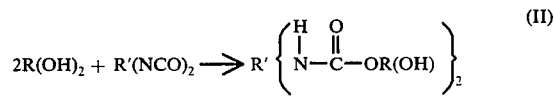

A glycol having at least one urethane bond and at least one urea bond (3) can be obtained by substituting a part of the glycol with an amino alcohol.

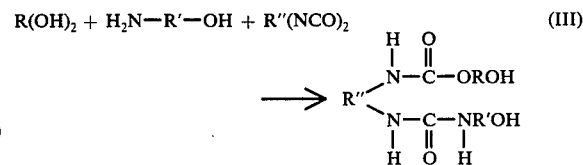

A triol having 6 urethane bonds (4) can be obtained by reacting 1 mole of a triol with 3 moles of a diisocyanate and then further reacting the product with 3 moles of a glycol.

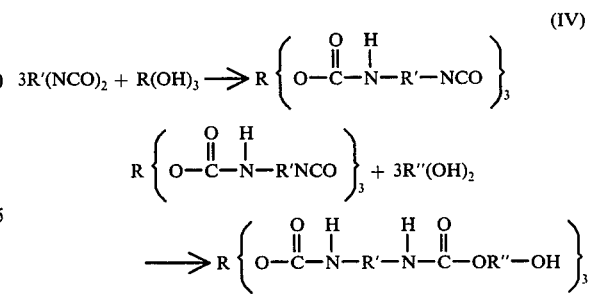

The amino alcohols having at least one urethane bond can be obtained by reacting a small amount of a diisocyanate with a mixture of a glycol and a diamine.

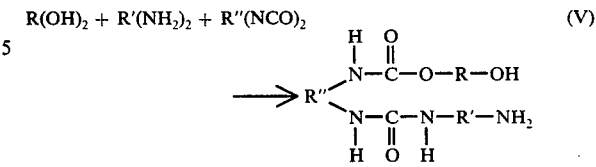

The urethane reaction can be easily performed by mixing the components at room temperature to 150° C to complete the reaction in several minutes to several hours.

When the urea bond is introduced, the reaction may be suddenly performed to partially cause gelation. Accordingly, it is preferable to react them in the condition obtained by diluting the components in a large amount of a polyol and to use the mixture without separating the polyol.

Suitable polyols used for the preparation of the polyol having at least one urethane bond include low molecular weight glycols such as ethyleneglycol, diethyleneglycol, propyleneglycol, 1,4-butyleneglycol, 1,6-hexamethyleneglycol; low molecular weight triols such as glycerin, trimethylolpropane; long chain glycols such as polyether glycols and polyester glycols which have a molecular weight of 400 to 2,000; and chain triols such as polyether triols and polyester triols.

The polyols used in the preparation of the urethane elastomers can be used as the starting material of the polyol except the polyols having a molecular weight of higher than 2,000. They may be characterized as having the formula HOGOH.

Suitable amino alcohols include low molecular weight amino alcohols such as aminoethyl alcohol and aminopropyl alcohol.

Suitable diamines include aromatic diamines such as diaminodiphenyl methanes having a substituent such as 4,4'-methylene bis(o-chloroaniline), 4,4'-methylene bis(2,3-dichloroaniline) and diaminobenzenes having a substituent such as 2,6-dichloro-p-phenylenediamine, methyl 4-chloro-3,5-diamino benzoate and aromatic diamines having no substituent. These diamines contain up to 9 carbon atoms and each carbon is attached to another carbon.

Suitable isocyanates include monoisocyanates such as phenyl isocyanate; and aromatic diisocyanates such as 2,4-tolylenediisocyanate (2,4-TDI), 2,6-tolylenediisocyanate (2,6-TDI), a mixture of 2,4-TDI and 2,6-TDI, m-phenylenediisocyanate, 4,4'-biphenyl diisocyanate, 3,3'-ditoluene-4,4'-diisocyanate (TODI), dianisidine diisocyanate (DADI), 4,4'-diphenylmethane diisocyanate (MDI), 3,3'-dimethyl-4,4'-diphenylmethane diisocyanate and 1,5-naphthalene diisocyanate and also aliphatic diisocyanates such as 1,6-hexamethylene diisocyanate (HMDI) isophorone diisocyanate, etc.

Various polyols and amino alcohols having at least one urethane bond can be obtained by various combinations of the polyols, the aminoalcohols, the diamines and the isocyanates. These components are useful for rapidly imparting the initial strength after the gelation in the process of the invention.

The physical properties of the molded products are different depending upon the purposes of the usages of the molded products and accordingly, these components are selected depending upon the purpose of the usages.

Suitable long chain polyols having a molecular weight of 400 to 5,000 which are used as component (1) in the process of the invention include aliphatic polyester glycols such as polyethyleneadipate and polybutyleneadipate which are obtained by condensing an aliphatic glycol and a dicarboxylic acid and chain-extending the product;

polyalkylene ether glycols such as polypropylene ether glycol and tetramethylene ether glycol which are obtained by a ring-opening polymerization of ethyleneoxide, propyleneoxide, tetrahydrofuran;

polyester glycols obtained by a ring-opening polymerization of ε-caprolactone;

polyols obtained by converting terminal groups of polybutadiene to hydroxyl groups;

copolymers obtained by copolymerizing two or more alkyleneglycols;

long chain diols having a molecular weight of 400 to 3,000 such as aromatic glycols;

polyester polyols obtained by a cocondensation of a polyol which will produce branching e.g. glycerine, trimethylol propane and an aliphatic glycol and a dicarboxylic acid; and polyether polyols obtained by a ring-opening polymerization of ethyleneoxide, propyleneoxide, tetrahydrofuran with an initiator of a polyol which will produce branching e.g. glycerine and trimethylol propane.

These long chain polyester polyols and long chain polyether polyols have a molecular weight of 600 to 5,000 and have 0.5 to 2 of branched points of the main chain having terminal hydroxyl groups per 1 molecule.

That is the polyols include long chain compounds having ether bond or ester bond and terminal hydroxyl groups.

Suitable aromatic diamines used as components (2) in the process of the invention include 4,4'-methylene-bis(2-chloroaniline), 4,4'-methylene-bis(2-carbomethoxyaniline), 4,4'-diaminodiphenyl disulfide, 4,4'-diaminodiphenyl sulfone, 4,4'-methylene-bis(2-methoxyaniline), 4,4'-methylene-bis(2-methylaniline), toluene-2,4-diamine, 1,5-naphthalenediamine, cumene 2,4-diamine, 4-methoxy 1,3-phenylenediamine, 1,3-phenylenediamine, 4-carbomethoxy-1,3-phenylenediamine, 4-carboethoxy-1,3-phenylenediamine, 4-chloro-1,3-phenylenediamine, 4-bromo-1,3-phenylenediamine, 4-ethoxy-1,3-phenylenediamine, 2,4'-diaminodiphenyl ether, 5,6-dimethyl-1,3-phenylenediamine, 2,4-dimethyl-1,3-phenylenediamine, 4,4'-diaminodiphenyl ether, benzidine, 4,6-dimethyl-1,3-phenylenediamine, 4,4'-methylenebisaniline, 4,4'-diaminodibenzyl-2,4-diaminostilbene, 1,4-anthradiamine, 2,5-fluorenediamine, 1,8-naphthalenediamine, 3,3'-biphenyldiamine, 2-methyl benzidine, 2,2'-dimethyl benzidine, 3,3'-dimethyl benzidine, 2,2'-dichloro-3,3'-dimethyl benzidine, 5,5'-dibromo-3,3'-dimethyl benzidine, 2,2'-dichlorobenzidine, 2,2'-dimethoxybenzidine, 3,3'-dimethoxybenzidine, 2,2',5,5'-tetramethyl benzidine, 2,2'-dichloro-5,5'-diethoxybenzidine, 2,2'-difluorobenzidine, 3,3'-difluorobenzidine, 2,2',6,6'-tetrachlorobenzidine, 3,3',5,5'-tetrachlorobenzidine, 4,4'-methylene bis(2,3-dichloroaniline), 4,4'-methylene bis(2,5-dichloroaniline), bis(4-amino-3-chlorophenyl) oxide, bis(4-amino-2-chlorophenyl) propane, bis(4-amino-2-chlorophenyl) sulfone, bis(4-amino-3-methoxyphenyl) decane, 5-carbomethoxy-1,3-phenylenediamine, 1,3-propanediol dipara amino benzoate, etc.

Suitable organic polyisocyanates used in the process of the invention for reaction with mixed components (1), (2) and (3) include 2,4-tolylenediisocyanate (2,4-TDI), 2,6-tolylene-diisocyanate (2,6-TDI), a mixture of 2,4-TDI and 2,6-TDI, dimer of 2,4-tolylenediisocyanate, m-phenylenediisocyanate, 4,4'-biphenyl diisocyanate, 3,3'-ditoluene-4,4'-diisocyanate (TODI), dianisidine diisocyanate (DADI), 4,4'-diphenylmethane diisocyanate (MDI), 3,3'-dimethyl-4,4'-diphenylmethane diisocyanate, 1,5-naphthalene diisocyanate (NDI), etc.

The organic polyisocyanate is used at a ratio of 0.90 to 1.30 equivalent preferably 1.00 to 1.15 equivalent per total of —NH$_2$ groups and —OH groups in the aromatic diamine, the long chain polyol and the polyol and/or amino alcohol which has at least one urethane bond.

In the process of the invention, the urethane elastomer is obtained by simultaneously reacting (1) the long chain polyol, (2) the aromatic diamine, (3) the polyol and/or amino alcohol having at least one urethane bond and the aromatic diisocyanate. The reactivities of the active hydrogen groups to —NCO groups are different depending upon the types and molecular weights of the components. Accordingly, it is necessary to control the reactivities of —OH groups with —NCO groups and the reactivities of —NH$_2$ groups with —NCO groups depending upon the hardness of the object urethane elastomer and the amounts of the components. It is possible to use various catalysts.

The catalysts include inorganic and organic tin compounds such as stannous chloride, stannic chloride, tetra-n-butyltin, tri-n-butyltin acetate, n-butyltin trichloride, trimethyltin hydroxide, dimethyltin dichloride, dibutyltin dilaurate, dibutyltin di-2-ethyl hexoate, stannous octoate, etc., and tertiary amines such as triethylamine, triethylenediamine, hexamethylenetetramine, N-methylmorpholine, N-ethylmorpholine, N-pentamethyldiethylenetriamine, N-hexamethyltriethylenetetramine, N,N-diethylaniline, N,N-dimethylbenzylamine, N,N-dimethyllaurylamine, N,N-dimethylpiperidine, N,N,N',N'-tetramethylethylenediamine, N,N,N',N'-tetramethylpropyldiamine, N,N,N',N'-tetramethyl-1,3-butanediamine, N,N,N',N'-tetramethylhexamethylenediamine, N,N,N',N'-pentamethyldiethylenetriamine, N,N,N',N'',N''',N''''-hexamethyltriethylenetetramine; and cyclic amidines and quaternary ammonium salts such as 1,8-diazabicyclo(5,4,0)-undecene-7(DBU manufactured by San Abott), DBU-methylammonium methosulfate, DBU-ethylammonium bromide; and cobalt naphthanate, sodium-O-phenylphenate, bismuth nitrate, potassium oleate, tetra(2-ethylhexyl) titanate, cobalt 2-ethyl hexoate (Co: 6%), ferric chloride, ferric 2-ethylhexoate (Fe: 6%), zinc naphthenate (Zn: 14.5%) and antimony trichloride.

In the process for producing the urethane elastomer of the invention, the organic polyisocyanate is mixed with the long chain polyol containing less than 0.1 wt. % of water, and thereafter the the aromatic diamine and the polyol and amino alcohol (having urethane bond) are added and mixed, or the organic polyisocyanate is mixed with a solution of the polyol and amino alcohol (having urethane bond) and the aromatic diamine in the dehydrated long chain polyol whereby the reaction of the components may be simultaneously performed at room temperature to 150° C.

The gelation of the mixture occurs in several to several tens of minutes. The mixture is fed into a mold within the pot-life which is the time from the mixing to the gelation, and it is set for several minutes to several hours and then the molded product is separated from the mold and then the shaped product is hardened in ageing at room temperature to 130° C for several hours to several days whereby the reaction is completed to produce the object urethane elastomer.

In the process of the invention, it is possible to add an anti-oxidant, a ultraviolet adsorbing agent, a deterioration inhibitor, a coloring inhibitor, a hydrolysis inhibitor, a fungicide, a flame retardant, a coloring agent and a filler etc., which are used in the conventional urethane elastomers.

The first advantage and characteristics of the invention are to remarkably improve the productivity with a short mold-separable period in one shot method.

The one shot method is especially suitable for a casting operating by a machine or an automatic casting and the casting operation having high efficiency has been attained even by the conventional one shot casting method though the mold-separable period has been unsatisfactorily long. Accordingly, the effect of shortening the mold-separable period is remarkably advantageous.

The second advantage of the process of the invention is to remarkably decrease a fluctuation or change of the mold-separable periods depending upon, that is, due to the casting temperature used.

In the one shot casting method, various complicated balanced reactions are performed, whereby the reactions are disadvantageously affected by the temperature in the mixing and the temperature of the mold.

In accordance with the process of the invention, the problem is overcome to provide the process suitable for the operation in the various places.

The third advantage of the process of the invention is to produce urethane elastomers having high transparency.

In the known one shot method, the miscibility of the components produced by the reactions is not satisfactory whereby turbidity is caused. In accordance with the process of the invention, the turbidity and the fluctuation of transparency are remarkably decreased to obtain the molded products having a constant transparency.

The fourth advantage of the process of the invention is that the polyols and amino alcohols having at least one urethane bond can be produced by recovering the waste obtained in the one shot method in a large amount of polyol under the reaction. The wastes are non-uniformly mixed materials and include the residue obtained at the initiation of the mixing and at the time of the finish of casting.

The waste can be easily recovered by using a large amount of a washing solution. When the polyol is used as the washing solution, the casting apparatus can be used as the apparatus for producing the polyol and amino alcohol having at least one urethane bond, and the waste can be recycled as the starting materials.

EXAMPLE 1

Preparation of polyol having urethane bond

A 100.0 g of polytetramethylene ether glycol having a molecular weight of 850 (PTMG) was heated to 40° C, and 5.2 g of a mixture of 80% of 2,4-toluenediisocyanate and 20% of 2,6-toluenediisocyanate (TDI-80) was mixed with PTMG and the mixture was heated at 70° C for 1 hour to react them. As the result, a mixed polyol having an average molecular weight of about 1190 which contains 33 mole % of a polyol having urethane bond and a molecular weight of 1870 was obtained.

Preparation of urethane elastomer (Invention)

A 103.5 g of the mixed polyol was mixed with 96.5 g of PTMG having a molecular weight of 1050 to form a mixed polyol having an average molecular weight of about 1130 which contains about 20 mole % of a polyol having urethane bond. A 45.0 g of 4,4'-methylene-bis(2,3-dichloro-aniline) (2,3-TCDAM) and 0.05 g of triethylene diamine (TEDA) were added to the mixed polyol to dissolve them.

The mixture was dehydrated with stirring at 120° C under a reduced pressure of 3 mmHg for 2 hours.

The dehydrated mixture was maintained at predetermined temperature and 60.0 g of TDI-80 was admixed with it at room temperature with stirring and the mixture was deaerated and was poured into a mold for sheet fabrication for the casting.

Preparation of urethane elastomer (conventional process)

A 98.5 g of PTMG having a molecular weight of 850, 101.5 g of PTMG having a molecular weight of 1050, 43.5 g of 2,3-TCDAM and 0.05 g of TEDA were mixed to dissolve them and then the mixture was dehydrated and 65.5 g of TDI-80 was admixed in the similar conditions of the former process. The urethane elastomer having similar physical properties was obtained.

Measurement and Test of mold separable period

After casting, each part of the sheet was sampled for each 10 minutes and the tear strength of each sample was measured. The time (minute) required for reaching the tear strength of 25 Kg/cm is given as the mold-separable period.

The tests for the mold-separable period were carried out at 70° C, 80° C, 90° C, 100° C and 110° C and the results are shown in the FIGURE.

Comparisons of characteristics

Various characteristics of the urethane elastomers produced by the process of the invention were compared with those of the urethane elastomers produced by the conventional process.

The results are shown in Table 1.

was changed to the atmospheric pressure and was poured into a mold heated at 100° C for the casting.

The gelation was resulted after 2 minutes from the casting and the mold could be separated after about 20 minutes from the casting. The condition of the product was excellent.

In accordance with the former process except using a mixture of PPG having a molecular weight of about 1600 and PPG having a molucular weight of 950 instead of GP having urethane bond, the casting was carried out.

The gelation was initiated after one minute from the addition of TDI-80 to rapidly set. However, the cracking was easily caused and it was difficult to separate the mold within 2 hours from the casting.

EXAMPLE 3

Preparation of polyol having urethane bond

Triisocyanate was produced by reacting 13.5 g of trimethylolpropane (TMP) with 50.5 g of 1,6-hexamethylene diisocyanate (HMDI) in 1 liter of ethyl acetate as a solvent at 40° C.

A 200 g of polyethyleneadipate (PEA) having the OH value of 160 was added to the triisocyanate and the mixture was heated at 120° C under a reduced pressure of 3 mmHg to remove the solvent and then the mixture was stirred for 2 hours to obtain 260 g of triol having the Table 1

|  | Process of the invention | | | | | Conventional process | | | | |
| --- | --- | --- | --- | --- | --- | --- | --- | --- | --- | --- |
|  | 110° C | 100 | 90 | 80 | 70 | 110 | 100 | 90 | 80 | 70 |
| Pot-life (min) | 5.5 | 6.0 | 8.0 | 11.0 | 7.0 | 6.0 | 6.0 | 4.5 | 4.0 | 5.0 |
| Initial viscosity (cps) | 110 | 120 | 130 | 140 | 160 | 100 | 105 | 110 | 120 | 140 |
| Mold separable period (min) | 35 | 32 | 37 | 33 | 35 | 60 | 67 | 74 | 83 | 96 |
| Hardness (shore A) | 91 | 91 | 90 | 91 | 91 | 91 | 91 | 90 | 90 | 90 |
| Modulus (100 %) (Kg/cm$^2$) | 55 | 57 | 58 | 57 | 59 | 55 | 55 | 56 | 56 | 52 |
| Modulus (200 %) (Kg/cm$^2$) | 88 | 84 | 90 | 82 | 91 | 79 | 73 | 78 | 75 | 72 |
| Modulus (300 %) (Kg/cm$^2$) | 143 | 129 | 140 | 120 | 154 | 122 | 110 | 120 | 113 | 104 |
| Tensile strength (Kg/cm$^2$) | 409 | 475 | 444 | 420 | 357 | 356 | 373 | 412 | 405 | 340 |
| Elongation (%) | 430 | 450 | 450 | 460 | 440 | 460 | 480 | 470 | 500 | 490 |
| Tear strength (Kg/cm) | 68 | 71 | 71 | 74 | 72 | 71 | 72 | 73 | 79 | 70 |
| Repulsive elasticity (%) | 39 | 38 | 39 | 39 | 41 | 42 | 44 | 45 | 45 | 46 |
| Compressive permanent set (%) | 25 | 26 | 25 | 27 | 24 | 24 | 26 | 28 | 25 | 29 |
| Transparency | Tp | Tp | Tp | Tp | Tp | Tp | Tl | Tl | Oq | Oq | note:
Tp transparance
Tl translucence
Oq Opaque

EXAMPLE 2

Preparation of polyol having urethane bond

A 750 g of polypropylene ether triol having a molecular weight of about 1500 (GP-1500) was mixed with 60 g of phenyl isocyanate at room temperature and the mixture was heated at 70° C for 2 hours to react them to obtain glycol having urethane bond which has the OH value of 73.

Preparation of urethane elastomer

A 530 g of polypropylene ether glycol having a molecular weight of about 950 (PPG), 470 g of GP-1500 having the urethane bond, 215 g of methylene-bis(2-chloro-aniline) (MOCA) and 0.5 g of stannous octoate (T-9) were mixed to dissolve them. The mixture was dehydrated at 130° C under a reduced pressure of 2 mmHg for 2 hours and then was cooled to 100° C.

A 310 g of TDI was admixed with the dehydrated mixture under a reduced pressure and the mixture was vigorously stirred for 30 seconds and then, the pressure OH value of 64.

Preparation of urethane elastomer (Invention)

A 130 g of triol having urethane bond, 190 g of PEA having the OH value of 56 and 34.0 g of 2.5-TCDAM were mixed to dissolve them. The mixture was dehydrated with stirring at 130° C under a reduced pressure of 5 mmHg for 1 hours.

A 75.0 g of 4,4'-diphenylmethane diisocyanate (MDI) melted at 45° C was admixed with the dehydrated mixture and the mixture was heated at 100° C and was deaerated and was poured into a mold for the casting. The mold could be separated after 30 minutes.

When the triol and diol of PEA which do not have urethane bond were used as the conventional process, it was difficult to separate a mold without heating it in the mold for longer than 1 hour, moreover, sometimes, an opaque product was obtained while the transparent product was always obtained by the process of the invention.

EXAMPLE 4

When the incompletely mixed part and the casting residue formed in the casting operation were recovered by automatically washing a mixing apparatus with the mixed polyol used in Example 1, and the mixture was used as the raw material for the casting, 13 Kg of PTMG having a molecular weight of 650 was used as the washing solution. When the mixture was reached to 20 Kg, the mixture was taken out.

The composition of the mixture was a reaction product formed by reacting about 1.38 Kg of TDI-80 with about 13 Kg of PTMG having a molecular weight of 650, about 2.22 Kg of PTMG having a molecular weight of 1050, about 2.38 Kg of glycol having urethane bond and having an average molecular weight of 1190 and about 1.03 Kg of 2,3-TCDAM.

The composition was the mixed polyol containing about 25 mole % of glycol having urethane bond and about 15 mole % of amino alcohol which had an average molecular weight.

In accordance with the process of Example 1 except using 120 g of PTMG having a molecular weight of 1050 and 80 g of the mixed polyol, the urethane elastomer was produced. The fabricatability for the casting and the physical properties of the product were similar to those of Example 1. The characteristics are shown in Table 2.

Table 2

|  | Example 1 (90° C) | Example 4 (90° C) mixed |
|---|---|---|
| PTMG - 1050 | 96.5 g | 120.0 g |
| Polyol having urethane bond |  |  |
| Exp 1 | 103.5 | — |
| Exp 4 | — | 80.0 |
| 2,3-TCDAM | 45.0 | 40.0 |
| TEDA | 0.05 | 0.03 |
| TDI - 80 | 60.0 | 65.0 |
| Temperature in mixing | 90° C | 90° C |
| Pot-life (min) | 8.0 | 7.0 |
| Initial viscosity (cps) | 130 | 120 |
| Mold separable period | 37 | 35 |
| Product Hardness | 90 | 91 |
| 100 % modulus (Kg/cm$^2$) | 58 | 59 |
| 200 % modulus (kg/cm$^2$) | 90 | 91 |
| 300 % modulus (kg/cm$^2$) | 140 | 149 |
| Tensile strength (Kg/cm$^2$) | 444 | 430 |
| Elongation (%) | 450 | 420 |
| Tear strength (Kg/cm) | 71 | 70 |
| Repulsive elasticity (%) | 39 | 38 |
| Compressive permanent set (%) | 25 | 28 |

What is claimed is:

1. A process for producing a urethane elastomer which comprises reacting
   an organic polyisocyanate with a mixture of
   component (1) which is a long chain polyol having a molecular weight within the range of 400 to 5,000 and characterized as composed of terminal alcoholic hydroxyl groups attached to a moiety which is hydrocarbon or hydrocarbon interrupted by carboxylic ester or ether linkages,
   a component (2) which is an aromatic diamine, and
   a component (3) which is in an ungelled state and which is at least one of (a) a polyol having at least one urethane bond or at least one urethane bond and urea bond and (b) an amino alcohol having at least one urethane bond and a urea bond,
   wherein at least one urethane bond of each of the components (a) and (b) is attached through the chain oxygen of said urethane bond to a group — GOH of a molecular weight such that HOGOH is of molecular weight not greater than 2000 wherein G is a divalent hydrocarbon moiety of a divalent hydrocarbon moiety interrupted by ester or ether linkages and wherein said G is otherwise unsubstituted or is substituted by alcoholic OH,
   wherein the polyol (a) containing a urea bond contains it in a moiety

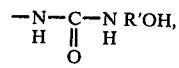

R' being a low molecular weight divalent hydrocarbon radical
   and wherein the amino alcohol (b) containing a urea bond contains it in a moiety

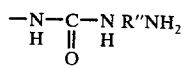

R" being a divalent radical which is attached to the indicated nitrogen atoms at carbon, which is not reactive with —NCO, and which contains up to 9 carbon atoms and each carbon of R" is attached to another carbon of R",
   all valences of the urethane and urea bonds in said (a) and (b) not above specified being attached to carbon atoms of organic radicals not reactive with —NCO, or said last mentioned radicals interrupted by at least one urethane linkage and constituting the balance of the molecule of each of (a) and (b),
   there being a ratio of 5-40 mol % of the component (3) to the total of component (1) and component (3), and there being 0.90 - 1.30 equivalent of organic polyisocyanate per total of —NH$_2$ and —OH groups in components (1), (2) and (3).

2. A process according to claim 1 wherein the polyol and amino alcohol having at least one urethane bond of component (3) are produced by reacting a compound having an isocyanate group with excess of at least one of a polyol and an amino alcohol.

3. A process according to claim 1 wherein the aromatic diamine component (2) is 4,4'-methylene-bis(2-chloroaniline), 4,4'-methylene-bis(2-carbomethoxyaniline), 4,4'-diaminodiphenyl disulfide, 4,4'-diaminodiphenyl sulfone, 4,4'-methylene-bis(2-methoxyaniline), 4,4'-methylene-bis(2-methylaniline), toluene-2,4-diamine, 1,5-naphthalenediamine, cumene 2,4-diamine, 4-methoxy 1,3-phenylenediamine, 1,3-phenylenediamine, 4-carbomethoxy-1,3-phenylenediamine, 4-carboethoxy-1,3-phenylenediamine, 4-chloro-1,3-phenylenediamine, 4-bromo-1,3-phenylenediamine, 4-ethoxy-1,3-phenylenediamine, 2,4'-diaminodiphenyl ether, 5,6-dimethyl-1,3-phenylenediamine, 2,4-dimethyl-1,3-phenylenediamine, 4,4'-diaminodiphenyl ether, benzidine, 4,6-dimethyl-1,3-phenylenediamine, 4,4'-methylenebisaniline, 4,4'-diaminodibenzyl-2,4-diaminostilbene, 1,4-anthradiamine, 2,5-fluorenediamine, 1,8-naphthalenediamine, 3,3'-biphenyldiamine, 2-methyl benzidine, 2,2'-dimethyl benzidine, 3,3'-dimethyl benzidine, 2,2'-dichloro-3,3'-dimethyl benzidine, 5,5'-dibromo-3,3'-dimethyl benzidine, 2,2'-dichlorobenzidine, 2,2'-dimethoxybenzidine, 3,3'-dimethoxybenzidine, 2,2',5,5'-tetramethyl benzidine, 2,2'-dichloro-5,5'-diethoxybenzidine, 2,2'-difluorobenzidine, 3,3'-difluorobenzidine, 2,2',6,6'-tetrachlorobenzidine, 3,3',5,5'-tetrachlorobenzidine, 4,4'-methylene bis(2,3- dichloroaniline), 4,4'-methylene bis(2,5-dichloroaniline), bis(4-amino-3-chlorophenyl) oxide, bis(4-amino-2-chlorophenyl) propane, bis(4-amino-2-chlorophenyl) sulfone, bis(4-amino-3-methoxyphenyl) decane, 5-carbomethoxy-1,3-phenylenediamine, or 1,3-propanediol dipara amino benzoate.

4. A process according to claim 1 wherein the organic polyisocyanate is 2,4-tolylenediisocyanate, 2,6-tolylenediisocyanate, a mixture of 2,4- and 2,6-tolylene diisocyanate, dimer of 2,4-tolylenediisocyanate, m-phenylenediisocyanate, 4,4'-biphenyl diisocyanate, 3,3'-ditoluene-4,4'-diisocyanate, dianisidine diisocyanate, 4,-4'-diphenylmethane diisocyanate, 3-3'-dimethyl-4,4'-diphenylmethane diisocyanate, or 1,5-naphthalene diisocyanate.

5. A process according to claim 1, wherein a catalyst for the reaction is present which is an inorganic or organic tin compound, a tertiary amine, a cyclic amidine or a quaternary ammonium salt.

6. A process according to claim 2 wherein the component (1) is
  (a) a linear aliphatic polyester glycol which is obtained by condensing an aliphatic glycol and a dicarboxylic acid;
  (b) a linear polyalkylene ether glycol which is obtained by a ring-opening polymerization of ethyleneoxide, propyleneoxide, or tetrahydrofuran;
  (c) polyester glycols obtained by a ring-opening polymerization of ε-caprolactone;
  (d) a polyol obtained by converting terminal groups of polybutadiene to hydroxyl groups;
  (e) a copolymer obtained by copolymerizing two or more alkyleneglycols;
  (f) a long chain aromatic glycol having a molecular weight of 400 to 3,000;
  (g) a polyester polyol obtained by a concondensation of polyols including a glycol, a polyol of —OH functionality to produce branching and a dicarboxylic acid; or
  (h) polyether polyols obtained by a ring-opening polymerization of ethyleneoxide, propyleneoxide, tetrahydrofuran with a polyol of —OH functionality to produce branching, the polyester polyol (g) and polyether polyol (h) having a molecular weight of 600 to 5,000 and having 0.5 to 2 branched points per molecule on the main chain having terminal hydroxyl groups.

7. A process according to claim 1, wherein the organic polyisocyanate is mixed with the long chain polyol (1) which polyol contains less than 0.1 wt.% of water, and thereafter components (2) and (3) are added, whereby a mixture of the four components is produced, and the reaction of the components is performed at room temperature to 150° C.

8. A process according to claim 1 including the further step of washing the apparatus in which the simultaneous reaction of claim 1 is performed with a polyol (1) to obtain a mixture containing a polyol having a urethane bond and an amino alcohol having urethane bond and recycling the mixture by reacting it in accordance with claim 1.

9. A process according to claim 1 wherein the organic polyisocyanate is mixed with a solution of components (2) and (3) in component (1) which has been dehydrated to contain less than 0.1% of water, whereby the reaction of the components is simultaneously performed at room temperature to 150° C.

10. A process according to claim 9 wherein component (3) is produced by reacting a polytetramethylene ether glycol and toluene diisocyanate.

11. A process according to claim 9 wherein component (3) is produced by reacting a polypropylene ether triol and phenyl isocyanate.

12. A process according to claim 9 wherein component (3) is produced by reacting polyethyleneadipate with a reaction product of hexamethylene diisocyanate and trimethylol propane.

13. A process according to claim 1 wherein the amino alcohol having at least one urethane bond and one urea bond of component (3) is obtained by reacting a diisocyanate with a mixture of an aromatic glycol and a diamine, the reaction involving equimolar amounts of each of the three components.

* * * * *

UNITED STATES PATENT AND TRADEMARK OFFICE
CERTIFICATE OF CORRECTION

PATENT NO. : 4,107,151

DATED : August 15, 1978

INVENTOR(S) : Akio Takahashi, et al

It is certified that error appears in the above-identified patent and that said Letters Patent are hereby corrected as shown below:

The attached columns 3 & 4 should be inserted as part of the above-identified patent.

THIS CERTIFICATE OF CORRECTION APPLYS TO THE GRANT EXCLUSIVELY.

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks* of a polyol and to use the mixture without separating the polyol.

Suitable polyols used for the preparation of the polyol having at least one urethane bond include low molecular weight glycols such as ethyleneglycol, diethyleneglycol, propyleneglycol, 1,4-butyleneglycol, 1,6-hexamethyleneglycol; low molecular weight triols such as glycerin, trimethylolpropane; long chain glycols such as polyether glycols and polyester glycols which have a molecular weight of 400 to 2,000; and chain triols such as polyether triols and polyester triols.

The polyols used in the preparation of the urethane elastomers can be used as the starting material of the polyol except the polyols having a molecular weight of higher than 2,000. They may be characterized as having the formula HOGOH.

Suitable amino alcohols include low molecular weight amino alcohols such as aminoethyl alcohol and aminopropyl alcohol.

Suitable diamines include aromatic diamines such as diaminodiphenyl methanes having a substituent such as 4,4'-methylene bis(o-chloroaniline), 4,4'-methylene bis(2,3-dichloroaniline) and diaminobenzenes having a substituent such as 2,6-dichloro-p-phenylenediamine, methyl 4-chloro-3,5-diamino benzoate and aromatic diamines having no substituent. These diamines contain up to 9 carbon atoms and each carbon is attached to another carbon.

Suitable isocyanates include monoisocyanates such as phenyl isocyanate; and aromatic diisocyanates such as 2,4-tolylenediisocyanate (2,4-TDI), 2,6-tolylenediisocyanate (2,6-TDI), a mixture of 2,4-TDI and 2,6-TDI, m-phenylenediisocyanate, 4,4'-biphenyl diisocyanate, 3,3'-ditoluene-4,4'-diisocyanate (TODI), dianisidine diisocyanate (DADI), 4,4'-diphenylmethane diisocyanate (MDI), 3,3'-dimethyl-4,4'-diphenylmethane diisocyanate and 1,5-naphthalene diisocyanate and also aliphatic diisocyanates such as 1,6-hexamethylene diisocyanate (HMDI) isophorone diisocyanate, etc.

Various polyols and amino alcohols having at least one urethane bond can be obtained by various combinations of the polyols, the aminoalcohols, the diamines and the isocyanates. These components are useful for rapidly imparting the initial strength after the gelation in the process of the invention.

The physical properties of the molded products are different depending upon the purposes of the usages of the molded products and accordingly, these components are selected depending upon the purpose of the usages.

Suitable long chain polyols having a molecular weight of 400 to 5,000 which are used as component (1) in the process of the invention include aliphatic polyester glycols such as polyethyleneadipate and polybutyleneadipate which are obtained by condensing an aliphatic glycol and a dicarboxylic acid and chain-extending the product;

polyalkylene ether glycols such as polypropylene ether glycol and tetramethylene ether glycol which are obtained by a ring-opening polymerization of ethyleneoxide, propyleneoxide, tetrahydrofuran;

polyester glycols obtained by a ring-opening polymerization of ε-caprolactone;

polyols obtained by converting terminal groups of polybutadiene to hydroxyl groups;

copolymers obtained by copolymerizing two or more alkyleneglycols;

long chain diols having a molecular weight of 400 to 3,000 such as aromatic glycols;

polyester polyols obtained by a cocondensation of a polyol which will produce branching e.g. glycerine. trimethylol propane and an aliphatic glycol and a dicarboxylic acid; and polyether polyols obtained by a ring-opening polymerization of ethyleneoxide, propyleneoxide, tetrahydrofuran with an initiator of a polyol which will produce branching e.g. glycerine and trimethylol propane.

These long chain polyester polyols and long chain polyether polyols have a molecular weight of 600 to 5,000 and have 0.5 to 2 of branched points of the main chain having terminal hydroxyl groups per 1 molecule.

That is the polyols include long chain compounds having ether bond or ester bond and terminal hydroxyl groups.

Suitable aromatic diamines used as components (2) in the process of the invention include 4,4'-methylene-bis(2-chloroaniline), 4,4'-methylene-bis(2-carbomethoxyaniline), 4,4'-diaminodiphenyl disulfide, 4,4'-diaminodiphenyl sulfone, 4,4'-methylene-bis(2-methoxyaniline), 4,4'-methylene-bis(2-methylaniline), toluene-2,4-diamine, 1,5-naphthalenediamine, cumene 2,4-diamine, 4-methoxy 1,3-phenylenediamine, 1,3-phenylenediamine, 4-carbomethoxy-1,3-phenylenediamine, 4-carboethoxy-1,3-phenylenediamine, 4-chloro-1,3-phenylenediamine, 4-bromo-1,3-phenylenediamine, 4-ethoxy-1,3-phenylenediamine, 2,4'-diaminodiphenyl ether, 5,6-dimethyl-1,3-phenylenediamine, 2,4-dimethyl-1,3-phenylenediamine, 4,4'-diaminodiphenyl ether, benzidine, 4,6-dimethyl-1,3-phenylenediamine, 4,4'-methylenebisaniline, 4,4'-diaminodibenzyl-2,4-diaminostilbene, 1,4-anthradiamine, 2,5-fluorenediamine, 1,8-naphthalenediamine, 3,3'-biphenyldiamine, 2-methyl benzidine, 2,2'-dimethyl benzidine, 3,3'-dimethyl benzidine, 2,2'-dichloro-3,3'-dimethyl benzidine, 5,5'-dibromo-3,3'-dimethyl benzidine, 2,2'-dichlorobenzidine, 2,2'-dimethoxybenzidine, 3,3'-dimethoxybenzidine, 2,2',5,5'-tetramethyl benzidine, 2,2'-dichloro-5,5'-diethoxybenzidine, 2,2'-difluorobenzidine, 3,3'-difluorobenzidine, 2,2',6,6'-tetrachlorobenzidine, 3,3',5,5'-tetrachlorobenzidine, 4,4'-methylene bis(2,3-dichloroaniline), 4,4'-methylene bis(2,5-dichloroaniline), bis(4-amino-3-chlorophenyl) oxide, bis(4-amino-2-chlorophenyl) propane, bis(4-amino-2-chlorophenyl) sulfone, bis(4-amino-3-methoxyphenyl) decane, 5-carbomethoxy-1,3-phenylenediamine, 1,3-propanediol dipara amino benzoate, etc.

Suitable organic polyisocyanates used in the process of the invention for reaction with mixed components (1), (2) and (3) include 2,4-tolylenediisocyanate (2,4-TDI), 2,6-tolylene-diisocyanate (2,6-TDI), a mixture of 2,4-TDI and 2,6-TDI, dimer of 2,4-tolylenediisocyanate, m-phenylenediisocyanate, 4,4'-biphenyl diisocyanate, 3,3'-ditoluene-4,4'-diisocyanate (TODI), dianisidine diisocyanate (DADI), 4,4'-diphenylmethane diisocyanate (MDI), 3,3'-dimethyl-4,4'-diphenylmethane diisocyanate, 1,5-naphthalene diisocyanate (NDI), etc.

The organic polyisocyanate is used at a ratio of 0.90 to 1.30 equivalent preferably 1.00 to 1.15 equivalent per total of —NH$_2$ groups and —OH groups in the aromatic diamine, the long chain polyol and the polyol and/or amino alcohol which has at least one urethane bond.

In the process of the invention, the urethane elastomer is obtained by simultaneously reacting (1) the long chain polyol, (2) the aromatic diamine, (3) the polyol and/or amino alcohol having at least one urethane bond